United States Patent [19]

Greenlee

[11] Patent Number: 4,620,628
[45] Date of Patent: Nov. 4, 1986

[54] CABLE DRIVE CONVEYOR SYSTEM AND A METHOD FOR CONVEYING ARTICLES IN A CONVEYOR SYSTEM

[75] Inventor: Fred S. Greenlee, Wichita, Kans.
[73] Assignee: Great Plains Ventures, Inc., Wichita, Kans.
[21] Appl. No.: 547,036
[22] Filed: Oct. 31, 1983
[51] Int. Cl.⁴ ............................................. B65G 13/07
[52] U.S. Cl. ..................................... 198/790; 198/781; 198/783
[58] Field of Search ............... 198/790, 781, 783, 844, 198/688, 787

[56] References Cited

U.S. PATENT DOCUMENTS

| | | | |
|---|---|---|---|
| 1,959,157 | 5/1934 | Eggleston | 198/787 |
| 2,129,510 | 9/1938 | Taylor | 198/787 |
| 4,088,224 | 5/1978 | Kittredge | 198/790 X |
| 4,091,916 | 5/1978 | Warner | 198/790 |
| 4,273,239 | 6/1981 | Thwaites et al. | 198/790 X |
| 4,278,166 | 7/1981 | Pirro, Jr. | 198/790 X |
| 4,284,190 | 8/1981 | Greenlee, III | 198/790 X |

Primary Examiner—Joseph E. Valenza
Assistant Examiner—Michael Stone
Attorney, Agent, or Firm—Edwin H. Crabtree

[57] ABSTRACT

A cable drive conveyor system in which a cable drive carried by idler sheaves communicates with conveyor carrier rollers. An endless cable is driven and is carried by the idler sheaves. At least one cable connector connects the two ends of the endless cable. A start pad covers the cable connector and has predetermined characteristics distinct with respect to the endless cable. A vertical urger which urges the idler sheaves towards the support rollers is mounted on adjustable pressure angle supports to cause the endless cable to generally maintain a constant pressure against the carrier rollers excepting when the start pad which covers the cable connector is carried by the idler sheaves.

23 Claims, 14 Drawing Figures

CABLE DRIVE CONVEYOR SYSTEM AND A METHOD FOR CONVEYING ARTICLES IN A CONVEYOR SYSTEM

BACKGROUND OF THE INVENTION

1. Field of the Invention

This invention provides a cable drive conveyor system. More specifically, this invention contemplates a process for conveying articles in a conveyor system and a cable drive conveyor system.

2. Description of the Prior Art

U.S. Pat. No. 3,116,823 by Schneider illustrates a power erected accumulator, and U.S. Pat. No. 3,537,568 by Leach discloses an article handling conveyor. U.S. Pat. No. 3,768,630 by Inwood, et al, discloses an accumulator with automatic override. U.S. Pat. No. 3,967,718 by Monahan discloses a live roller conveyor. U.S. Pat. No. 3,960,262 by Henig, and U.S. Pat. No. 4,223,780 by Saur, and U.S. Pat. No. 4,108,303 by Vogt, et al, all teach an accumulating conveyor. None of the foregoing prior art teach or suggests the particular cable drive conveyor system and the method for conveying articles of this invention.

SUMMARY OF THE INVENTION

This invention accomplishes its desired objects by providing a novel cable drive conveyor system comprising a pair of support members generally equidistantly separated from each other throughout their lengths while serpentinely traversing a base floor and having at least one curved section and at least one straight section. Support means attached to the pair of support members for supporting and positioning the conveyor system at a desired height from the base floor. A plurality of carrier rollers rotatably connect to the support members. A plurality of sheave support members interconnect the pair of support members underneath the carrier rollers. At least one support angle means is connected to and is supported by the sheave support members. The support angle means has a structure defining a plurality of angle apertures. At least one pressure angle means is in contact with and slidably positioned over and against the support angle means. An attachment means interconnects the support angle means and the pressure angle means within the angle apertures; and at least one idler sheave is rotatably attached to the pressure angle means. At least one return bracket means is attached to a selected sheave support member underneath the support angles. At least one return sheave rotatably connects to the return bracket means. Means for vertically urging the pressure angle means away from the support means while the attachment means within the angle aperture slidably holds the pressure angle means and the support angle means together is provided. At least one inside curved idler pulley bracket assembly means includes an inside idler pulley bracket means secured to one of the support members. An inside idler plate means pivotally connects to the inside idler pulley bracket means at an inside pivotation point. A plurality of inside idler sheaves rotatively connects to the inside idler plate means, and a plurality of inside return sheaves is rotatively secured to the inside idler pulley bracket means underneath the inside idler sheaves of the inside idler plate means. Means for vertically urging the inside idler plate means away from the inside idler pulley bracket means is provided. A conveyor cable drive means mechanically communicates with the conveyor system, and an endless cable is drawn by the drive means and is trained over and carried by the idler sheaves, the return sheaves, the inside idler sheaves and by the inside return sheaves. At least one cable connection means connects two ends of the endless cable, and a start pad covers the at least one cable connection means and has predetermined characteristics distinct with respect to the endless cable. The means for vertically urging the pressure angle means away from the support angle means and the means for vertically urging the inside idler plate means away from the inside idler pulley bracket means both cause the endless cable to generally maintain a constant pressure against the carrier rollers, excepting when the start pad which covers the cable connection means is carried by the idler sheave and the inside idler sheaves.

A method for conveying articles in a conveyor system having a pair of support members and a plurality of carrier rollers rotatably connected to the support members including a conveyor system that has at least one curved section and one straight section. The method comprises the steps of: (a) attaching rotatably underneath the straight section of the conveyor system in a plurality of idle sheaves to a plurality of pressure angles that are in slidable contact with a plurality of support angles including an adjustable means between the pressure angles and the support angles for vertically urging the pressure angle away from the support angle: (b) attaching rotatably underneath a first curved section of the conveyor system a plurality of first idle sheaves to a plurality of first idler plates that are hingedly attached to a plurality of first idler pulley brackets including a first adjustable means between the first idler plates and the first idler pulley brackets for vertically urging the first idler plates including the attached first idle sheaves away from the first idler pulley brackets; (c) positioning over the idle sheaves and the first idle sheaves a nylon means covered endless cable that is engaged to the conveyor cable drive means and has at least two ends that are connected by a connection means covered with a start pad; (d) adjusting the adjustable means and the first adjustable means such that the nylon means coated cable is in frictional contact with the plurality of carrier rollers and generally maintains a constant pressure against the carrier rollers such as to convey on the carrier rollers articles that are already moving but not articles which have been stopped; and (e) increasing pressure to the carrier rollers by passing the connection means covered start pad underneath the carrier rollers such as to cause a positive start up action to the accumulated articles on the carrier rollers to begin conveying the articles in a single file manner until once again stopped.

It is an object of the invention to provide a novel cable drive conveyor system and method for conveying articles.

Still further objects of the invention reside in the provision of a cable drive conveyor system which can be easily connected, and is relatively inexpensive to manufacture.

These together with the various ancillary objects and features will become apparent as the following description proceeds, are attained by this invention, preferred embodiments being shown in the accompanying drawings, by way of example only, wherein:

DETAILED DESCRIPTION OF THE INVENTION

Figure 1:
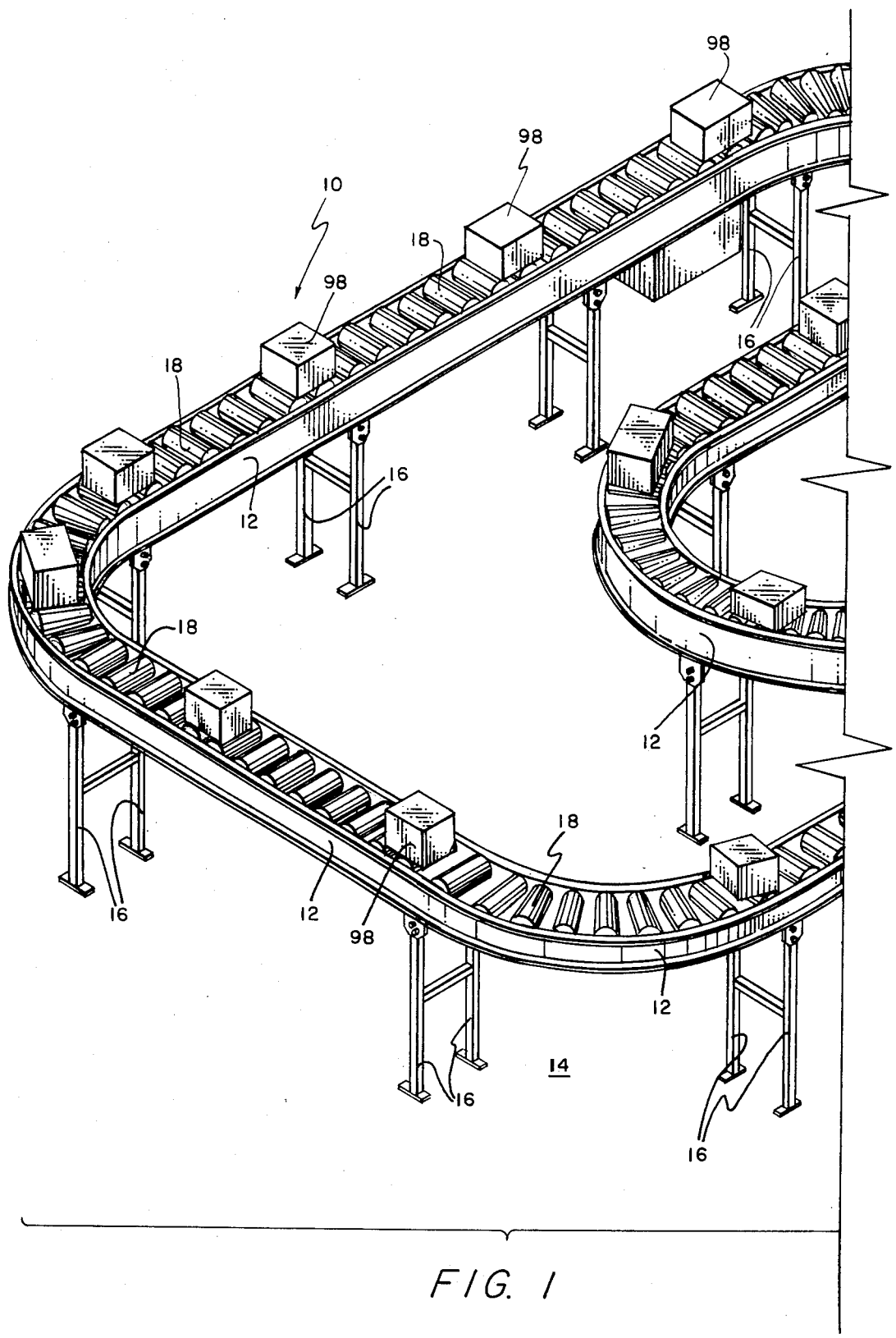
FIG. 1 is a perspective view of a typical serpentine conveyor made possible by the invention.
Figure 1:
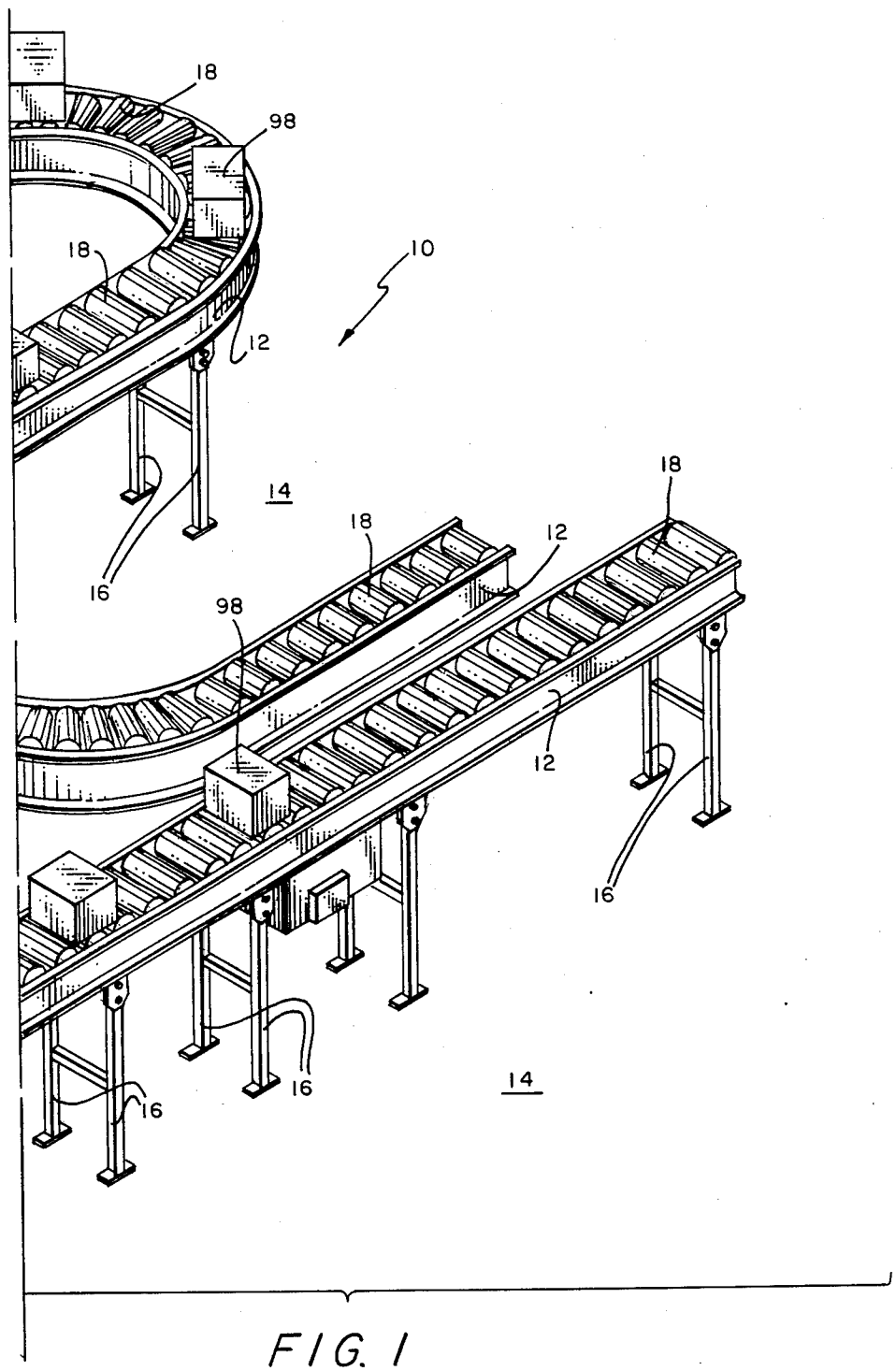
Figure 2:
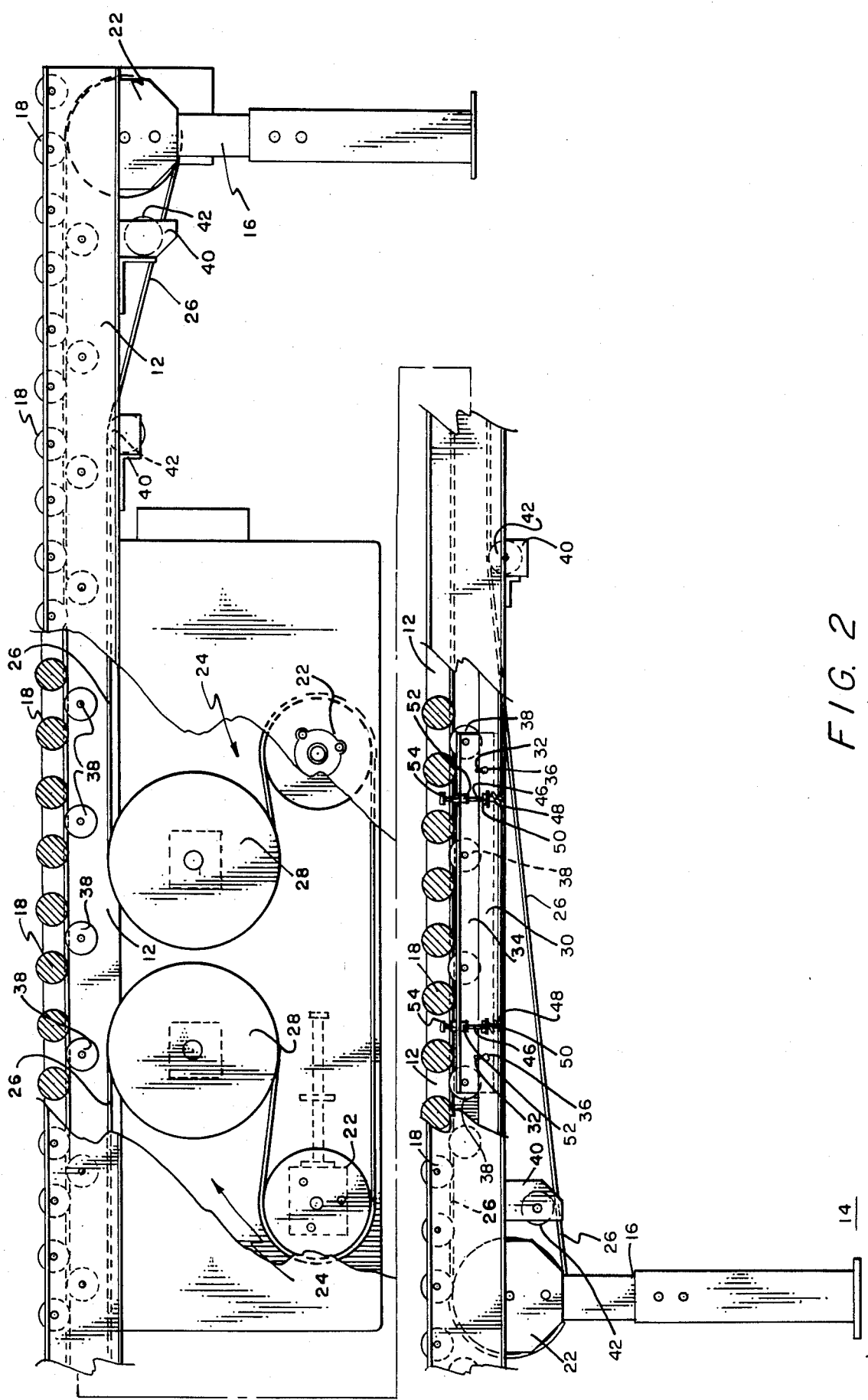
FIG. 2 is a side elevation view partly taken away to show the drive cable and drive system.

Referring in detail now to the drawings, wherein identical reference numerals represent similar parts of the invention, there is seen the reversible cable drive conveyor system of this invention, generally illustrated as 10, having a pair of support members 12—12 which are generally equidistantly separated from each other throughout their lengths while serpentinely traversing a base floor 14. The conveyor system, as shown in FIG. 1, has curved sections and straight sections. Supports 16—16 attach to the pair of support members 12—12 at regular intervals for supporting and positioning the conveyor system 10 at a desired height from the base floor 14. A plurality of carrier rollers 18 is rotatably connected to the support members 12—12, and sheave support members 20 interconnect the pair of support members 12—12 at regular intervals underneath the carrier rollers 18. Direction rollers 22—22 (or sheaves) are positioned at the ends of the conveyor system 10 and underneath a conveyor cable drive means, generally illustrated as 24, in order to aid an endless conveyor cable 26 in its return course. Drive means 24 comprises a motor (not shown in the drawings) and drive drums 28—28 (or drive sheaves) receiving power-take off from the motor.

Figure 3:
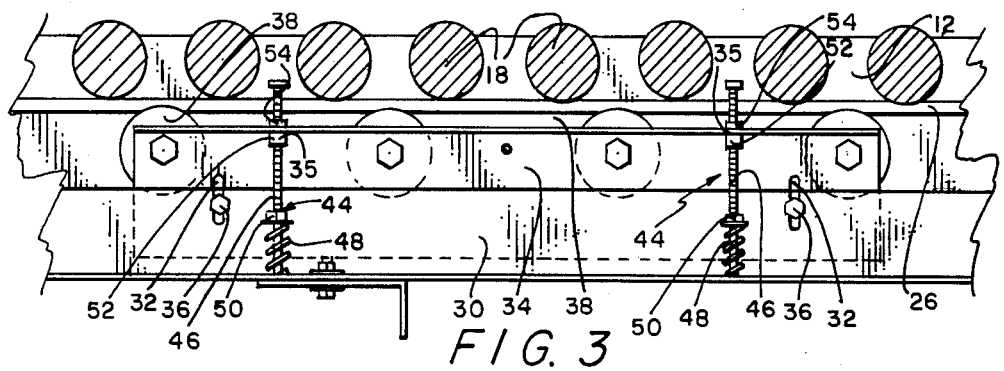
FIG. 3 is a side elevation view disclosing the cable, idler pulleys supporting the cable, and tensioning means to hold the idler pulleys against the cable.
Figure 4:
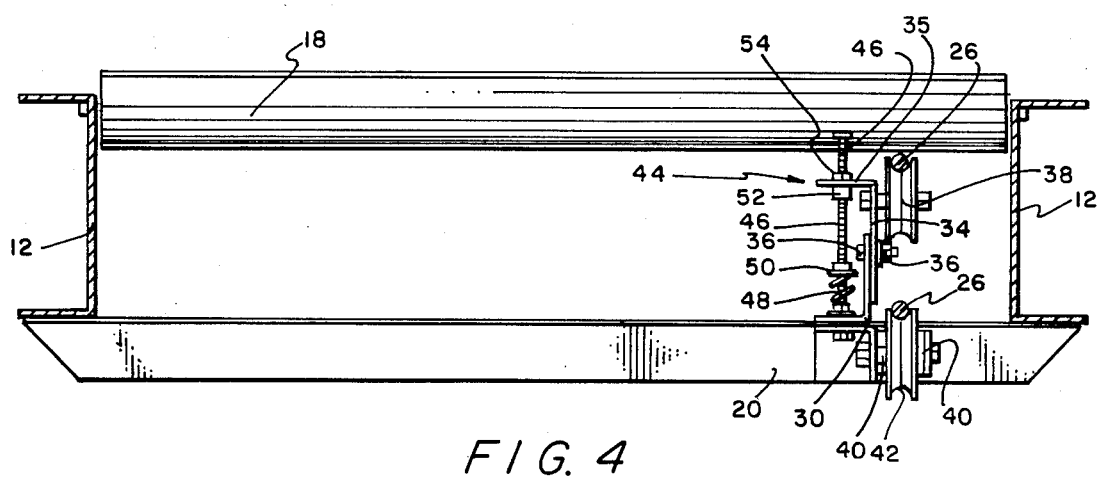
FIG. 4 is an end view of the apparatus shown in FIG. 3.

At generally regular intervals in the straight sections of the conveyor system 10, as illustrated in FIGS. 3 and 4, a support angle 30 is connected to and is supported by a sheave support member 20 and has a structure defining a plurality of angle apertures 32—32. A pressure angle 34 is in contact with and slidably positioned over and against the support angle. 20. Pressure angle 34 has a structure defining a plurality of bolt apertures 35. An attachment means (e.g. a nut and bolt assembly) 36 interconnects the support angle 30 and the pressure angle 34 within the angle apertures 32—32. An idler sheave 38 rotatably attaches to each of the pressure angle 34. A return bracket 40 attaches to selected sheave support members 20 underneath selected support angle 30. Return sheaves 42 are connected to the return bracket 40 to aid the endless cable 26 in its return course. Support angle 30 and pressure angle 34 have attached thereto a means, generally illustrated as 44, for vertically urging, the pressure angle 34 away from the support angle 30 while the attachment means or nut and bolt assembly 36, within holds the pressure angle 34 and the support angle 30 together.

In a preferred embodiment of the invention, means for vertically urging 44 comprises a plurality of bolts 46 disposed through the bolt apertures 35: a spring 48 surrounding the base of the bolt 46 and supported by the support angle 30; and a lock nut 50 rotatably secured to the bolt 46 for compressing or releasing the spring 48. A nut insert 52 is rotatably secured to the bolt 46 and supports the pressure angle 34: and a nut 54 is rotatable on the bolt 46 and against the pressure angle 34 such that the nut 54 and the nut insert 52 sandwich the pressure angle 34 while retaining the same to the bolt 46.

Figure 5:
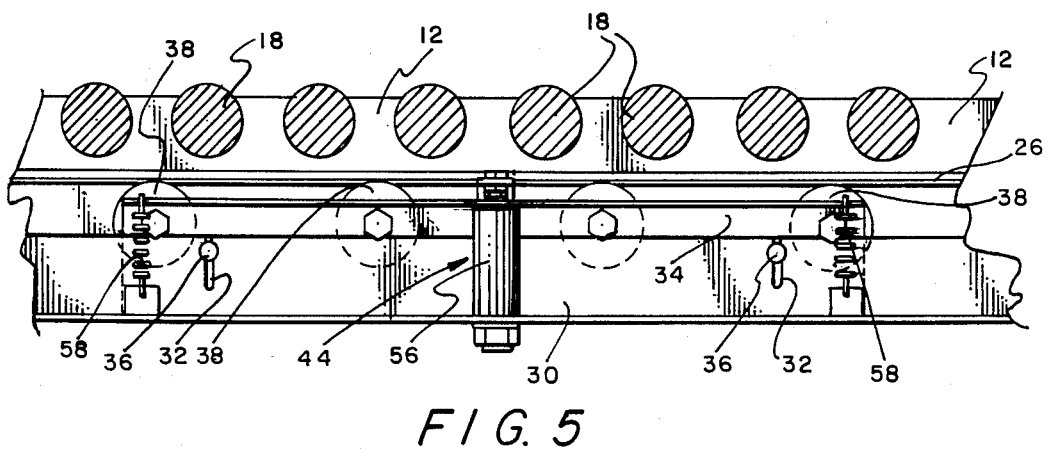
FIG. 5 is a side elevation view similar to that of FIG. 3 showing cylinder means to engage idler pulleys with the cable.
Figure 6:
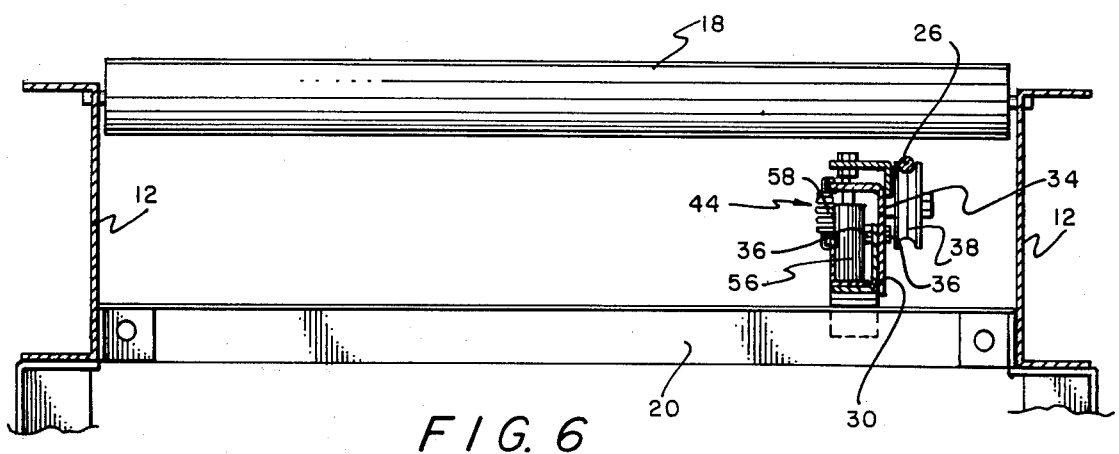
FIG. 6 is an end view of the apparatus of FIG. 5.

In another preferred embodiment of the invention, means for vertically urging 44 may include a solenoid or a cylinder 45 pneumatically operated (see FIGS. 5 and 6). In this embodiment, the solenoid or the pneumatic cylinder 56 is connected to the support angle 30 and to the pressure angle 34, and is supported by the support angle 30. A pneumatic spring 58 is interconnected between the support angle 30 and the pressure angle 34 (as shown in FIG. 6) in order to bias and slide the pressure angle 34 towards the support angle 30 after the pneumatic cylinder 56 is deactivated.

Figure 7:
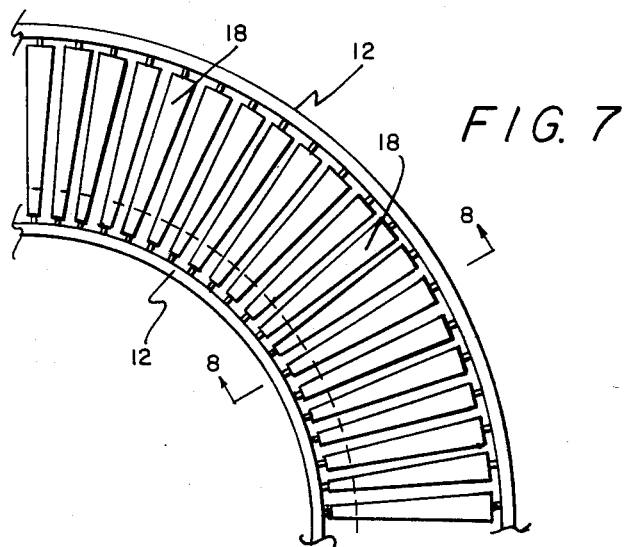
FIG. 7 is a top plan view of a curved conveyor section drawn by the cable on the inside thereof.
Figure 9:
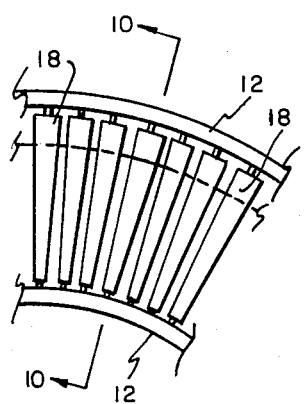
FIG. 9 is a top plan view of a curved conveyor section driven by the cable on the outside thereof.
Figure 10:
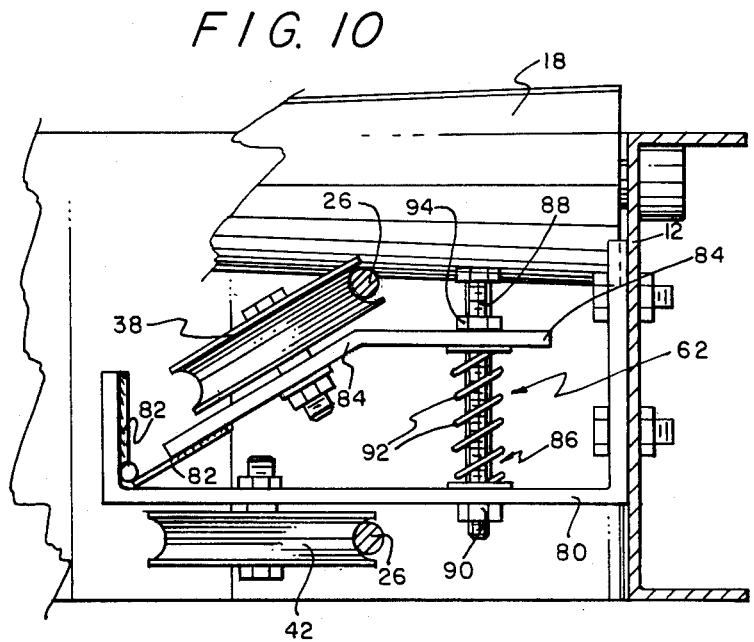
FIG. 10 is a partial exploded vertical sectional view taken in direction of the arrows and along the plane of line 10—10 in FIG. 9.

A curved section (e.g. FIGS. 7 and 9) of the conveyor system 10 includes either at least one inside curve idler pulley bracket assembly, generally illustrated as 60 (see FIGS. 8 and 11), or at least one outside curve idler pulley bracket assembly, generally illustrated as 62 (see FIG. 10). Assemblies 60 and 62 have the same functionality but one operates on the inside of a curved section of the conveyor system 10 (see FIG. 7) and the other operates on the outside of a curved section of the conveyor system 10. The choice of which assembly (60 or 62) to employ depends generally on which way or direction the conveyor system 10 curves as it traverses serpentinely the base floor 14.

Figure 8:
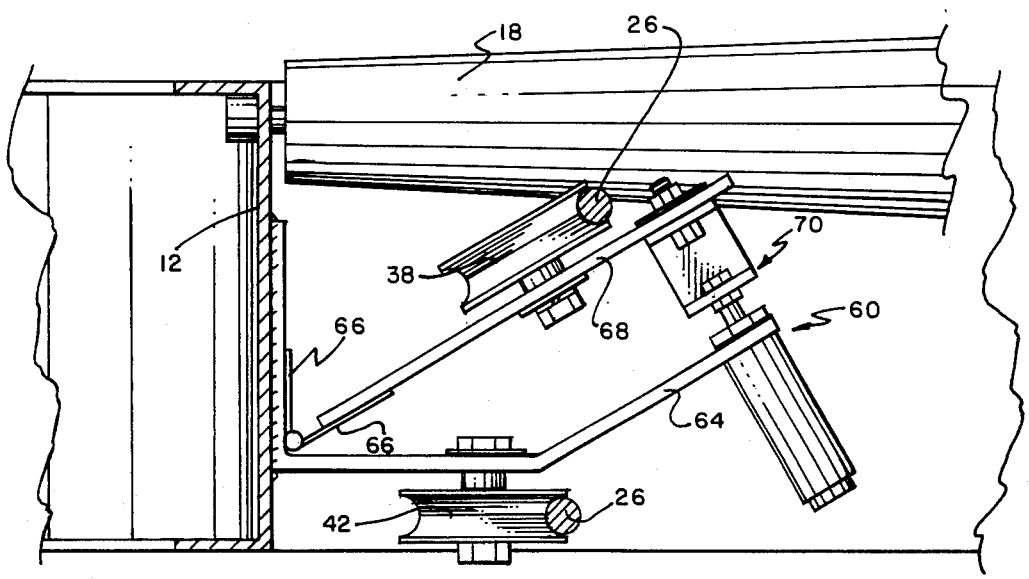
FIG. 8 is a partial vertical sectional view taken in direction of the arrows and along the plane of line 8—8 in FIG. 7.

Inside curve idler pulley bracket assembly 60 includes an inside idler pulley bracket 64 secured to and inside the curved section support member 12. A hinge 66 is bound to pulley bracket 64, and an inside idler plate 68 is connected to hinge 66, such that inside idler plate 68 is pivotal with respect to support member 12 and to pulley bracket 64. Idler sheave 38 rotatably connects to each of the idler plates 68. A return sheave 42 is rotatably connected to each of the pulley brackets 64 to aid the endless cable 26 in its return course. A means, generally illustrated as 70, for vertically urging the idler plate 68 away from the idler pulley bracket 64 is interconnected between the idler pulley bracket 64 and the idler plate 68. In a preferred embodiment of the invention, means for vertically urging 70 includes pressure adjusted bolt 72 disposed through the idler plate 68 and the pulley bracket 64 (see FIG. 11). Nut insert 74 threadably attaches to the lower end of the bolt 72 and supports the pulley bracket 64. Compression spring 76 surrounds the bolt 72 between the idler plate 68 and the idler pulley bracket 64 for biasing the idler plate 68 away from the roller pulley bracket 64. Nut 78 threadably engages an upper end of the pressure adjusted bolt 72 and is generally flushed against the top of the idler plate 68 when the same is biased by compression spring 76. Nut 78 functions to adjust the tension which spring 76 imparts between idler plate 68 and bracket 64. Means for vertically urging 70 may also include (as shown in FIG. 8) an inside solenoid valve or an inside pneumatic operated cylinder, both of which would attach to pulley bracket 64 and engage with idler plate 68.

Outside curve idler pulley bracket assembly 62 includes an outside idler pulley bracket 80 secured to an outside curved section support member 12. A hinge 82 is bound to pulley bracket 80 and an outside idler plate 84 is connected to hinge 82 such that outside idler plate 84 is pivoted with respect to pulley bracket 80. Idler sheave 38 rotatably connects to each of the idler plates 84. A return sheave 42 is rotatably connected to each of the pulley brackets 80 to aid the endless cable 26 in its return course. A means, generally illustrated as 86, for vertically urging the outside idler plate 84 away from the outside pulley bracket 80 is interconnected between the idler pulley bracket 80 and the outside idler plate 84. In a preferred embodiment of the invention, means for vertically urging 86 includes pressure adjusted bolt 88 disposed through the outside idler plate 84 and the pulley bracket 80 (see FIG. 10). Nut insert 90 threadably attaches to the lower end of the bolt 88 and supports the pulley bracket 80. Compression spring 92 surrounds the bolt 88 between the outside idler plate 84 and the outside idler pulley bracket 80 for biasing the idler plate 84 away from the outside idler pulley bracket 80. Nut 94 threadably engages an upper end of the pressure adjusted bolt 88 and is generally flushed against the top of the idler plate 84 when the same is biased by the compression spring 92. Nut 94 functions similarly to nut 78 in adjusting the tension which spring 92 imparts between idler plate 94 and bracket 80. Means for vertically urging 86 may also include a solenoid valve or a pneumatic operated cylinder which could be used in the means for vertically urging 70. Similar to the case for the solenoid valve and the pneumatic operated cylinder of the means for vertically uring 70, the solenoid valve or the pneumatic cylinder of the means for urging 86 is attached to outside pulley bracket 80 and engages with outside idler plate 84.

Figure 12:
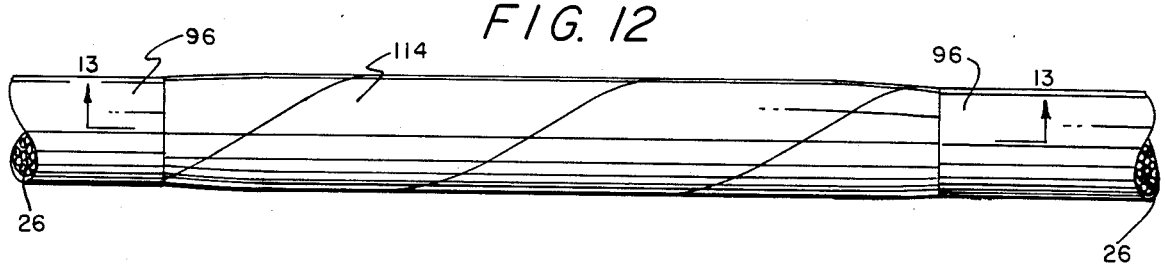
FIG. 12 is a side elevational view of the cable connector.

The endless cable 26 is trained over and carried by all idler and return sheaves in addition to the direction rollers 22—22. In a preferred embodiment of the invention, cable 26 is a galvanized wire cable with a flexible nylon plastic means 96 (see FIGS. 12, 13 and 14) such as that manufactured under the trademark LOLON "F" by the Loos & Company Pomfret, Connecticut. The wire cable 26 of this invention provides the features of a stretchless drive system of great strength and high flexibility. The nylon means 96 provides an adequate coefficient of friction for drive when needed while maintaining ability to go around small diameter idler and return sheaves. The stretchless characteristics of the cable 26 of this invention means that, once properly tensioned, the cable 26 needs virtually no periodic retensioning which is characteristic of other systems. The cable 26 of this invention is constantly guided by idler sheaves 38 as the cable 26 comes in contact with the carrier rollers 18 to move through friction the same to transport articles 98. Cable 26 requires no tracking initially or during its life.

Figure 13:
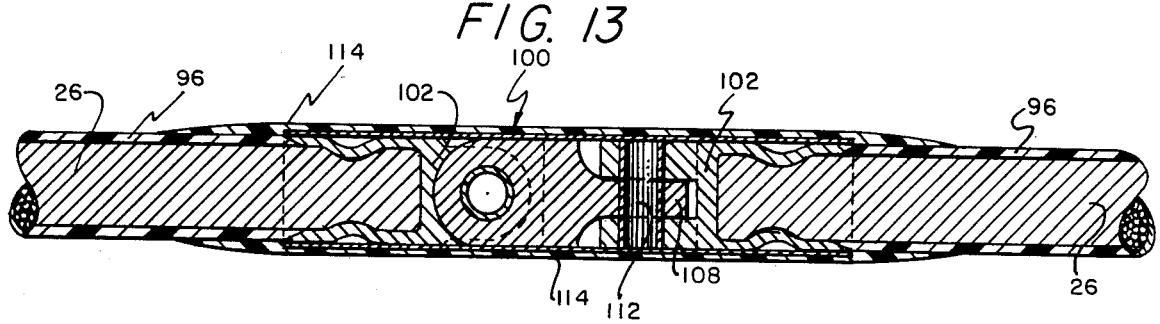
FIG. 13 is a vertical sectional view taken in direction of the arrows and along the plane of line 13—13 in FIG. 12.
Figure 14:
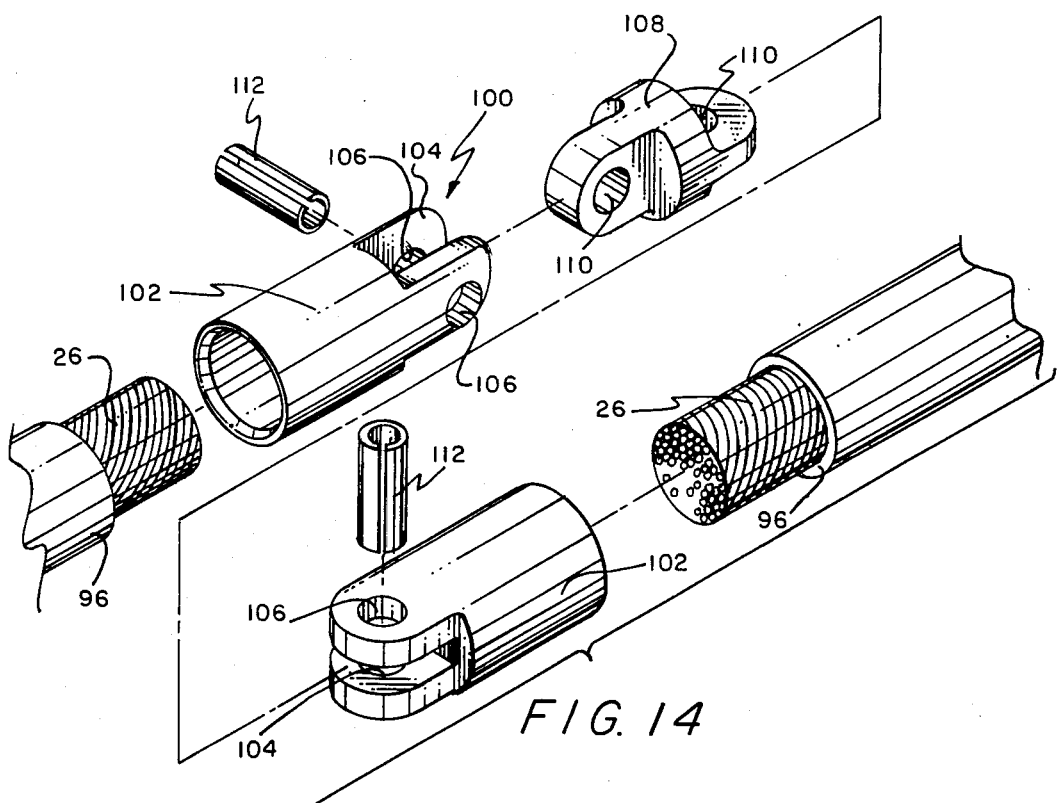
FIG. 14 is an exploded segmented view showing the various parts of the cable connection pivot mechanism.

An important feature of this invention in addition to the use of nylon coating the cable 26, is at least one cable connection means, generally illustrated as 100 in FIGS. 13 and 14, for connecting two ends of the cable 26 together. Connection means 100 comprises a pair of fork cable connection means 102—102, each having an end 104 defining a yoke with yoke apertures 106. Cable center pivot piece 108 with pivot piece apertures 110 pivotally secures to each yoke end 104 of fork cable connection means 102 by being received within the respective yokes 104 of the fork cable connection means 102 and the placing of a connection pin 112 through the respective yoke apertures 106 and pivot piece apertures 110. The connection means 100 of this invention enables the cable 26 to bend around small diameter idler and return sheaves 38 and 42 respectively, without additional bulk to the connection means 100. The slop between the forks 102—102 and the center piece 108 is designed to allow up to thirty degrees (30°) of cable 26 bend without binding. Should the cable 26 break, connection means 100 may be utilized to quickly mend the cable 26.

Figure 11:
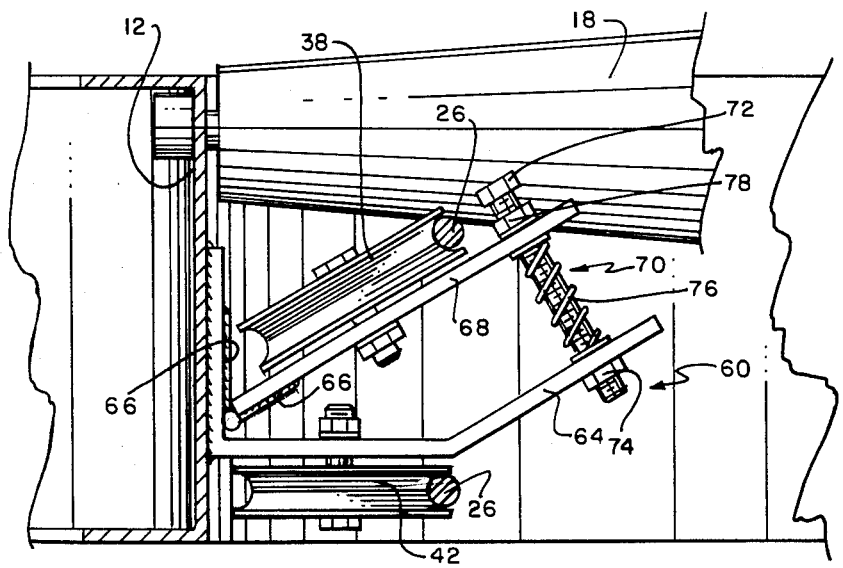
FIG. 11 is a partial vertical sectional view of the drive cable system with spring bias means to force the cable into a drive relationship with the rollers.

A start pad 114 (see FIGS. 12 and 13) preferably covers the connection means 100 and has predetermined characteristics (e.g. neoprene) that are distinct with respect to the nylon coated cable 26. In a preferred embodiment of the invention, nylon coated cable 26 would be selected for a low co-efficient of friction in order that, when properly adjusted, nylon coated cable 26 will exert enough drawing force to keep any article 98 on carrier rollers 18 in motion in the curved section and in the straight section of the conveyor system 10. The carrier rollers 18 in the curved section (as shown in FIGS. 8, 10, and 11) of the conveyor system 10 each has a structure that tapers from a larger diameter on the outside and to a smaller diameter on the inside and in order to uniformly move the articles 98 at the same speed around any given curved sections. Once any article 98 has stopped, nylon coated cable 26 alone will not restart the movement of any article 98 along the conveyor system 10. Therefore, in order to restart the articles 98, start pad 114 is used. Start pad 114 covering the connection means 100 has the characteristics of a greater thickness than the nylon coated cable 26 and higher co-efficient of friction to accomplish the restart. Once the article 98 has been restarted by start pad 114 the nylon coated cable 26 will keep the article 98 in motion on the carrier rollers 18 until stopped again (e.g. manually or by an obstruction).

With continuing reference to the drawings for operation of the invention and the method for conveying articles in the conveyor system 10, conveyor system 10 is a nylon coated cable driven conveyor, as opposed to a belt driven conveyor, that uses a simple principle of physics, that is, it takes more energy to start something moving than it takes to keep it moving. Carrier rollers 18 are driven by a drive means 24 driving a nylon coated cable 26 which has a low coefficient of friction. Cable pressure in the straight sections of the conveyor system 10 may be increased or decreased by adjusting the spring biased urging means 44 (of FIG. 4), or the solenoid for the pneumatic cylinder 56 (of FIGS. 5 and 6), located underneath nontapered carrier rollers 18. Cable pressure in the curve sections of the conveyor system 10 may also be increased or decreased by adjusting the compression spring biased means 70 for urging (of FIG. 11) for the inside curve idler pulley bracket assembly 60, or the inside solenoid valve or the inside pneumatic operated cylinder (of FIG. 8) for the same, located underneath the tapered carrier rollers 18 of FIGS. 8 and 11. Likewise, with respect to outside curve idler pulley bracket assembly 62, cable pressure may be increased or decreased by adjusting the compression spring biased means 86 for urging (of FIG. 10) or the solenoid valve or the pneumatic cylinder for the assembly 62, located underneath the tapered rollers 18 of FIG. 10. When properly adjusted in accordance with what was previously mentioned, nylon coated cable 26 of FIG. 3,12 and 13 may only convey moving articles 98 (i.e. those articles 98 placed on carrier rollers 18 and shoved), but will not start articles 98 which have been stopped (i.e. either by hand or hitting another stationary article 98). Thus, pressure or accumulating articles 98 is near zero. The articles 98 will remain stationary until the connection means 100 (covered with the start pad 114) increases pressure to the carrier rollers 18 causing a positive start-up action to the accumulated articles 98. Articles 98 will begin moving in a single file manner and continue to do so until once again stopped. In a preferred embodiment of the invention idler sheaves 38 are supported by spring loaded means 44, 70 and 86 of FIGS. 4, 11 and 10 respectively. The spring loaded feature when used in combination with the start pad 114 feature, will help avoid soft pressure spots when conveying as well as excessive pressure from the start pad 114. Because of the variable pressure, both heavy and light articles 98 may be conveyed or accumulated without damage. Therefore, the need for eccentric rollers and trigger mechanisms is eliminated. The nylon means covered cable 26 feature of this invention, provides a nylon covered cable 26 that doesn't stretch and has great strength and high flexibility. The nylon 96, both in size and compound, provides adequate co-efficient of friction for drive, while maintaining ability to go around small diameter idler sheaves 38 and return sheaves 42. Once the nylon coated cable 26 is properly tensioned, it will need no periodic re-tensioning which is characteristic of other convenyor systems. Also, because the cable 26 is constantly guided by idle sheaves 38 pressurized from spring loaded means 44, 70 and 86, it requires no tracking initially or during its life.

Various alterations may be made in the foregoing constructions without departing from the scope of the invention, and it is intended that the drawings and embodiments of the invention are to be merely illustrative.

I claim:

1. A cable drive conveyor system comprising a pair of support members generally equidistantly separated from each other throughout their lengths while serpentinely traversing a base floor and having at least one curved section and at least one straight section:
    support means attached to said pair of support members for supporting and positioning said conveyor system at a desired height from the base floor;
    a plurality of carrier rollers rotatably connected to the support members;
    a plurality of sheave supports members interconnecting said pair of support members underneath said carrier rollers;
    at least one support angle means connected to and supported by said sheave support members, said support angle means having a structure defining a plurality of angle apertures: at least one pressure angle means in contact with and slidably positioned over and against said support angle means; an attachment means interconnecting said support angle means and said pressure angle means within said angle apertures; at least one idler sheave rotatably attached to said pressure angle means; at least one return bracket means attached to a selected sheave support member underneath of said selected support angles; at least one return sheave rotatably connected to said return bracket means;
    means for vertically urging the pressure angle means away from said support angle means while said attachment means within said angle apertures slidably holds the pressure angle means and support angle means together;
    at least one inside curve idler pulley bracket assembly means including an inside idler pulley bracket means secured to one of the support members, an inside idler plate means pivotally connected to said inside idler pulley bracket means at an inside pivotation point, a plurality of inside idler sheaves rotatably connected to said inside idler plate means, a plurality of inside return sheaves rotatably secured to the inside idler pulley bracket means underneath said inside idler sheaves of said inside idler plate means, means for vertically urging said inside idler plate means away from said inside idler pulley bracket means;
    a conveyor cable drive means mechanically communicating with the conveyor system;
    an endless cable being driven by said drive means and being trained over and carried by said idler sheaves, said return sheaves, said inside idler sheaves and by said inside return sheaves;
    at least one cable connection means connecting two ends of said endless cable;
    a start pad covering the at least one cable connection means and having predetermined characteristics distinct with respect of said endless cable;
    said means for vertically urging the pressure angle means away from the support angle means and said means for vertically urging said inside idler plate means away from said inside idler pulley bracket means both cause said endless cable to generally maintain a constant pressure against the carrier rollers, excepting when said start pad which covers said cable connection means is carried by said idler sheaves and said inside idler sheaves.

2. The cable drive conveyor of claim 1 wherein said inside idler pulley bracket means is secured to the support member on the inside of said curved section.

3. The cable drive conveyor of claim 2 additionally comprising at least one outside curve idler pulley bracket assembly means including an outside idler pulley bracket means secured to the support member on the outside of said curved section, an outside idler plate means pivotally connected to said outside idler pulley bracket means at an outside pivotation point, a plurality of outside idler sheaves rotatably connected to said outside idler plate means, a plurality of outside return sheaves rotatably secured to the outside idler pulley bracket means underneath said outside idler sheaves of said outside idler plate means, means for vertically urging said outside idler plate means away from said outside idler pulley bracket means; said endless cable also being trained over and carried by said outside idler sheaves and by said outside return sheaves; and said means for vertically urging said outside idler plate means away from said outside idler pulley bracket means causes said endless cable to generally maintain a constant pressure against the carrier rollers, excepting when said start pad is carried by said outside idler sheaves.

4. The cable drive conveyor of claim 1 wherein said pressure angle means additionally has a structure defining a plurality of bolt apertures, said means for vertically urging said pressure angle means away from said support angle means comprises a plurality of bolt means disposed through said bolt apertures, spring bias means surrounding the base of said bolt means and supported by said support angle; a lock nut means rotatably secured to said bolt means for compressing or releasing said spring bias means, a nut sert means rotatably secured to said bolt and support said pressure angle means; and a nut means rotatable on said bolt means and against said pressure angle means such that said nut means and said nut sert means sandwich said pressure angle means while retaining the same to said bolt means.

5. The cable drive conveyor of claim 1 wherein said means for vertically urging the pressure angle means away from said support angle means comprises a solenoid means connected to said support angle means and to said pressure angle means and supported by said support angle means.

6. The cable drive conveyor of claim 1 wherein said means for vertically urging the pressure angle means away from the support angle means comprises a pneumatic means connected to said support angle means and to said pressure angle means and supported by said support angle means.

7. The cable drive conveyor of claim 6 additionally comprising a pneumatic spring means which interconnects the support angle means and the pressure angle means for biasing said pressure angle means towards said support means after the pneumatic means is deactivated.

8. The cable drive conveyor of claim 2 wherein said means for vertically urging said inside idler plate means away from said inside idler pulley bracket means comprises a solenoid valve means interconnected to said inside idler pulley bracket means and engaged to said inside idler plate means.

9. The cable drive conveyor of claim 2 wherein said means for vertically urging said inside idler plate means away from said inside idler pulley bracket means comprises a pneumatic means connected to said inside idler pulley bracket means and engaged to said inside idler plate means.

10. The cable drive conveyor of claim 3 wherein said means for vertically urging said outside idler plate means away from said outside idler pulley bracket means comprises a solenoid valve means interconnected to said outside idler pulley bracket means and engaged to said outside idler plate means.

11. The cable drive conveyor of claim 3 wherein said means for vertically urging said outside idler plate means away from said outside idler pulley bracket means comprises a pneumatic means connected to said outside idler pulley bracket means and engaged to said outside idler plate means.

12. The cable drive conveyor of claim 2 wherein said means for vertically urging said inside idler plate means away from said inside idler pulley bracket means comprises an inside pressure adjusted bolt means disposed through said inside idler plate means and said inside idler pulley bracket means, an inside nut sert means threadably attached to the lower end of said inside bolt means and supporting said inside idler pulley bracket means; inside compression spring means surrounding said inside pressure adjusted bolt means between said inside idler plate means and said inside idler pulley bracket means for biasing said inside idler plate means away from said inside idler pulley bracket means; and an inside nut means threadably engaging an upper end of said inside pressure adjusted bolt means and generally flushed against the top of said inside idler plate means when the same is biased by the inside compression spring means.

13. The cable drive conveyor of claim 3 wherein said means for vertically urging said outside idler plate means away from said outside idler pulley bracket means comprises an outside pressure adjusted bolt means disposed through said outside idler plate means and said outside idler pulley bracket means, an outside nut sert means threadably attached to the lower end of said outside bolt means and supporting said outside idler pulley bracket means; outside compression spring means surrounding said outside pressure adjusted bolt means between said outside idler plate means and said outside idler pulley bracket means for biasing said outside idler plate means away from said idler pulley bracket means; and an outside nut means threadably engaging an upper end of said outside pressure adjusted bolt means and generally flushed against the top of said outside idler plate means when the same is biased by the inside compression spring means 14. The cable drive conveyor of claim 1 wherein said cable connection means comprises a fork cable terminal means secured to each end of the cable that are to be joined; a cable center pivot means pivotally secured to each fork cable terminal means; said start pad sliding over and covering said fork cable terminal means and said cable center pivot means.

15. The cable drive conveyor of claim 2 additionally comprising an inside hinge means attached to said inside idler pulley bracket means and to said inside idler plate means to define the pivotation point between said inside idler plate means and said inside idler pulley bracket means.

16. The cable drive conveyor of claim 3 additionally comprising an outside hinge means attached to said outside idler pulley bracket means and to said outside idler plate means to define the pivotation point between said outside idler plate means and said outside idler pulley bracket means.

17. The cable drive conveyor of claim 3 wherein said carrier rollers in the curved section of the serpentine traversing conveyor system have a structure that tapers from a larger diameter on one end to a smaller diameter on the other end.

18. The cable drive conveyor of claim 17 wherein the start pad section of the conveyor cable is thicker than all other sections of the cable, said start pad has a higher coefficient of friction than said conveyor cable.

19. The cable drive conveyor of claim 1 wherein said endless cable has a nylon means coating the outside thereof.

20. A method for conveying articles in a conveyor system having a pair of support members and a plurality of carrier rollers rotatably connected to the support members including a conveyor cable drive means mechanically communicating with the conveyor system that has at least one curve section and one straight section, the method comprising the steps of:

(a) attaching rotatably underneath the straight section of the conveyor system a plurality of idle sheaves to a plurality of pressure angles that are in slidable contact with a plurality of support angles including an adjustable means between the pressure angles and the support angles for vertically urging the pressure angle away from the support angle;

(b) attaching rotatably underneath a first curve section of the conveyor system a plurality of first idle sheaves to a plurality of first idler plates that are hingedly attached to a plurality of first idler pulley brackets including a first adjustable means between the first idler plates and the first idler pulley brackets for vertically urging the first idler plates including the attached first idle sheaves away from the first idler pulley bracket;

(c) positioning over the idle sheaves of step (a) and the first idle sheaves of step (b) a nylon means covered endless cable that is engaged to the conveyor cable drive means and has at least two ends that are connected by a connection means covered with a start pad;

(d) adjusting the adjustable means of steps (a) and the first adjustable means of step (b) such that the nylon means coated cable of step (c) is in frictional contact with the plurality of carrier rollers and generally maintains a constant pressure against the carrier rollers such as to convey on the carrier rollers articles that are already moving but not articles which have been stopped; and (e) increasing pressure to the carrier rollers by passing the connection means covered start pad underneath the carrier rollers such as to cause a positive start up action to the accumulated articles on the carrier rollers which begin conveying the articles in a single file manner until once again stopped.

21. The method for conveying of claim 20 additionally comprising attaching rotatably underneath a second curve section of the conveyor system a plurality of second idle sheaves to a plurality of second idler plates structurally dissimilar to the first idler plates, said second idler plates are hingedly secured to a plurality of second idler pulley brackets structurally dissimilar to the first idler pulley brackets and including a second adjustable means between the second idler plates and the second idler pulley brackets for vertically urging the second idler plates including the attached second idle sheaves away from the second idler pulley bracket.

22. The method of claim 21 additionally comprising positioning over the second idle sheaves the nylon means covered endless cable.

23. The method of claim 22 adjusting the second adjustable means in accordance with step (d).

* * * * *